United States Patent
Kim

(10) Patent No.: US 11,427,050 B2
(45) Date of Patent: Aug. 30, 2022

(54) HEAT PUMP SYSTEM FOR VEHICLE

(71) Applicants: Hyundai Motor Company, Seoul (KR); Kia Motors Corporation, Seoul (KR)

(72) Inventor: Yeonho Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 158 days.

(21) Appl. No.: 17/094,604

(22) Filed: Nov. 10, 2020

(65) Prior Publication Data

US 2021/0379962 A1 Dec. 9, 2021

(30) Foreign Application Priority Data

Jun. 9, 2020 (KR) .................. 10-2020-0069718

(51) Int. Cl.
*B60H 1/00* (2006.01)
*B60H 1/22* (2006.01)

(52) U.S. Cl.
CPC ......... *B60H 1/00428* (2013.01); *B60H 1/005* (2013.01); *B60H 1/00007* (2013.01); *B60H 1/00278* (2013.01); *B60H 1/00392* (2013.01); *B60H 1/00485* (2013.01); *B60H 1/00907* (2013.01); *B60H 1/22* (2013.01); *B60H 2001/00957* (2013.01)

(58) Field of Classification Search
CPC ............ B60H 1/00428; B60H 1/00007; B60H 1/00278; B60H 1/00392; B60H 1/00485; B60H 1/005; B60H 1/00907; B60H 1/22; B60H 2001/00957
USPC ........................................................ 165/202
See application file for complete search history.

(56) References Cited

U.S. PATENT DOCUMENTS

| 10,814,692 | B2 * | 10/2020 | Kim | .................. B60H 1/32284 |
| 10,974,566 | B2 * | 4/2021 | Kim | .................. B60H 1/00278 |
| 2020/0180391 | A1 * | 6/2020 | Kim | ...................... B60H 1/3223 |
| 2020/0338950 | A1 * | 10/2020 | Kim | .................. B60H 1/00921 |

* cited by examiner

*Primary Examiner* — Davis D Hwu
(74) *Attorney, Agent, or Firm* — Morgan, Lewis & Bockius LLP

(57) ABSTRACT

A heat pump system may include a cooling apparatus configured to include a radiator, a first water pump, a first valve, a second valve, and a reservoir tank which are connected through a coolant line; a battery cooling apparatus including a battery coolant line connected to the coolant line through the first valve, and a second water pump and a battery module which are connected through the battery coolant line to circulate the coolant in the battery module; a heating apparatus including a heating line connected to the coolant line through the second valve and a third water pump provided on the heating line, and a heater; a chiller provided in the battery coolant line between the first valve and the battery module, connected to a chiller connection line through the second valve connected to the chiller connection line, and connected to a refrigerant line of an air conditioner through a refrigerant connection line.

20 Claims, 8 Drawing Sheets

HEAT PUMP SYSTEM FOR VEHICLE

CROSS-REFERENCE TO RELATED APPLICATION

The present application claims priority to Korean Patent Application No. 10-2020-0069718 filed on Jun. 9, 2020, the entire contents of which is incorporated herein for all purposes by this reference.

BACKGROUND OF THE INVENTION

Field of the Invention

The present invention relates to a heat pump system for a vehicle. More particularly, the present invention relates to a heat pump system for a vehicle which adjusts a temperature of a battery module by use of one chiller that performs heat exchange between a refrigerant and a coolant and improves heating efficiency by use of waste heat generated from an electrical component.

Description of Related Art

In general, an air conditioner for a vehicle includes an air conditioning system for circulating a coolant to heat or cool an interior of the vehicle.

Such an air conditioner maintains a comfortable indoor environment by maintaining an internal temperature of the vehicle at an appropriate level regardless of an external temperature change, so that the interior of the vehicle is warmed or cooled through heat exchange by a condenser and an evaporator during a process in which a refrigerant discharged by driving of a compressor circulates back to the compressor after passing through a condenser, a receiver dryer, an expansion valve, and an evaporator.

That is, the air conditioner system condenses a gaseous coolant of a high temperature and a high pressure compressed by the compressor in a cooling mode in the summer to reduce a temperature and humidity of the interior of the vehicle through evaporation in the evaporator through the receiver dryer and the expansion valve.

Meanwhile, in recent years, as interest in energy efficiency and environmental pollution has been increasing, there has been a demand for the development of environmentally friendly vehicles configured for substantially replacing internal combustion engine vehicles. The environmentally friendly vehicles are usually fuel cell or electric vehicles driven by electricity or a hybrid vehicle driven by an engine and a battery.

Among the environmentally friendly vehicles, the electric vehicle or the hybrid vehicle does not use a separate heater, unlike an air conditioner of a general vehicle, and the air conditioner applied to the environmentally friendly vehicle is generally referred to as a heat pump system.

On the other hand, in the case of the electric vehicle, chemical reaction energy of oxygen and hydrogen is converted into electrical energy to generate driving force. In the present process, since thermal energy is generated by the chemical reaction in the fuel cell, effectively removing the generated heat is essential in securing performance of the fuel cell.

Furthermore, even in the hybrid vehicle, a motor is driven by use of the electricity supplied from the fuel cell or an electric battery together with an engine that operates by general fuel to generate the driving force, and as a result, the performance of the motor may be secured only by effectively removing the heat generated from the fuel cell or the battery and the motor.

As a result, in the hybrid vehicle or the electric vehicle generally, a battery cooling system needs to be separately formed with a separate sealing circuit together with a cooler and the heat pump system to prevent the heat generation in the motor and electrical components, and the battery including the fuel cell.

Accordingly, the size and weight of a cooling module disposed in the front of the vehicle increase and a layout of connection pipes that supply the refrigerant and the coolant to the heat pump system, the cooler, and the battery cooling system is complicated in an engine compartment.

Furthermore, the battery cooling system which heats or cools the battery according to a status of the vehicle for the battery to show optimal performance is separately provided, and as a result, a plurality of valves for connection with the respective connection pipes are adopted and noise and vibration due to frequent opening and closing operations of the valves are transferred to the interior of the vehicle to degrade ride comfort.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a heat pump system for a vehicle, which adjusts a temperature of a battery module by use of one chiller that performs heat exchange between a refrigerant and a coolant and improves heating efficiency by use of waste heat generated from an electrical component.

Various aspects of the present invention are directed to providing the heat pump system for the vehicle, including: a cooling apparatus configured to include a radiator, a first water pump, a first valve, a second valve, and a reservoir tank which are connected through a coolant line, to circulate a coolant in the coolant line to cool at least one electrical component provided in the coolant line; a battery cooling apparatus including a battery coolant line connected to the coolant line through the first valve, and a second water pump and a battery module which are connected through the battery coolant line to circulate the coolant in the battery module; a heating apparatus including a heating line connected to the coolant line through the second valve to heat a vehicle interior by use of a coolant and a third water pump and a heater provided on the heating line; a chiller provided in the battery coolant line between the first valve and the battery module, connected to a chiller connection line through the second valve connected to the chiller connection line, and connected to a refrigerant line of an air conditioner through a refrigerant connection line, to adjust a temperature of the coolant by performing heat exchange between the coolant which is circulated in the battery coolant line and a refrigerant which is selectively supplied from the air conditioner;, and wherein the reservoir tank may be provided in the coolant line between the radiator and the first valve, and is connected to the coolant line connecting the first valve and the first water pump through a supply line bypassing the first valve.

The heater may be provided inside a heating, ventilation, and air conditioning (HVAC) module of the air conditioner.

The battery cooling apparatus may include a coolant heater provided in the battery coolant line between the battery module and the chiller.

When the battery module is heated, the battery coolant line may not be connected to the coolant line by the operation of the first valve; the coolant may be circulated along the battery coolant line by the operation of the second water pump; and the coolant heater may be operated to heat a coolant supplied to the battery module along the battery coolant.

The air conditioner may include: a heating, ventilation, and air conditioning (HVAC) module configured to include an evaporator which is connected thereto through the refrigerant line and a door configured to control an outside air passing through the evaporator to be selectively introduced into the heater depending on a cooling mode, a heating mode, and a heating and dehumidification mode of the vehicle therein; a condenser provided in the heating line between the second valve and the heater to circulate a coolant therein to perform heat exchange between the coolant and a refrigerant supplied through the refrigerant line connected to the condenser; a compressor connected between the evaporator and the condenser through the refrigerant line; a first expansion valve provided in the refrigerant line between the condenser and the evaporator; and a second expansion valve provided in the refrigerant connection line.

The air conditioner may further include: a sub-condenser provided in the refrigerant line between the condenser and the evaporator; and an accumulator provided in the refrigerant line between the evaporator and the compressor and connected to the refrigerant connection line.

A first end portion of the refrigerant connection line may be connected to the refrigerant line between the sub-condenser and the first expansion valve, and a second end portion of the refrigerant connection line may be connected to the accumulator between the evaporator and the compressor.

Each of the chiller and the condenser may be a water-cooled heat exchanger, and the sub-condenser may be an air-cooled heat exchanger.

The HVAC module may further include an air heater provided between the heater and the evaporator to selectively heat outside air introduced into the heater.

The air heater may be operated to raise a temperature of the outside air passing through the heater when a temperature of a coolant supplied to the heater is lower than a target temperature for internal heating.

When the battery module is cooled by use of the refrigerant, in the cooling apparatus, the coolant may be circulated in the coolant line by the operation of the first water pump, and the supply line may be opened; the chiller connection line may be closed through operation of the second valve; the heating apparatus may be deactivated; in the battery cooling apparatus, the coolant may be circulated in the battery coolant line by the operation of the second water pump; the cooling apparatus and the battery cooling apparatus may form an independent closed circuits through which each coolant is separately circulated by the operation of the first valve; in the air conditioner, the refrigerant line connected to the evaporator by the operation of the first expansion valve may be closed, and the refrigerant connection line may be opened through operation of the second expansion valve; and the second expansion valve may expand a refrigerant supplied to the refrigerant connection line and supply the expanded refrigerant to the chiller.

When the battery module is cooled in the cooling mode of the vehicle, in the cooling apparatus, the coolant may be circulated in the coolant line by the operation of the first water pump, and the supply line may be opened; the chiller connection line may be closed through operation of the second valve; in the heating apparatus, the coolant may be circulated in the heating line through operation of the third water pump in a state where the coolant line and the heating line are connected through operation of the second valve; in the battery cooling apparatus, the coolant may be circulated in the battery coolant line by the operation of the second water pump; the cooling apparatus and the battery cooling apparatus may form an independent closed circuits through which each coolant is separately circulated by the operation of the first valve; in the air conditioner, the refrigerant line connected to the evaporator by the operation of the first expansion valve may be closed, and the refrigerant connection line may be opened through operation of the second expansion valve; and the second expansion valve may expand a refrigerant supplied to the refrigerant connection line and supply the expanded refrigerant to the chiller.

When performing the heating and dehumidification mode of the vehicle, the cooling apparatus and the battery cooling apparatus may be deactivated; the coolant line and the chiller connection line may be closed through operation of the second valve; in the heating apparatus, the coolant may be circulated in the heating line through operation of the third water pump; and in the air conditioner, the refrigerant connection line may be closed by the operation of the second expansion valve, and the refrigerant may be circulated along the refrigerant line by the operation of the compressor.

When waste heat of the electrical component and the condenser is recovered in a heating mode of the vehicle, in the cooling apparatus, the coolant line connected to the radiator and the coolant line connecting the radiator and the reservoir tank may be closed, and the supply line may be opened; the battery coolant line except for a portion of the battery coolant line connected to the chiller may be closed through operation of the first valve; the chiller connection line may be opened through operation of the second valve; the coolant having a temperature that has risen while passing through the electrical component by the operation of the first water pump may be supplied to the chiller along the opened coolant line and the opened chiller connection line without passing through the radiator; the coolant may be circulated along the heating line through operation of the third water pump; a part of the coolant stored in the reservoir tank may be circulated along the opened coolant line through the opened supply line; the cooling apparatus and the heating apparatus may form an independent closed circuit through which each coolant is separately circulated by the operation of the second valve; in the air conditioner, the refrigerant line connected to the evaporator by the operation of the first expansion valve may be closed, and the refrigerant connection line may be opened through operation of the second expansion valve; the refrigerant may be circulated along the refrigerant line by the operation of the compressor; and the second expansion valve may expand a refrigerant supplied to the refrigerant connection line and supply the expanded refrigerant to the chiller.

When cooling the electrical component and the battery module by use of the coolant cooled in the radiator, the chiller connection line may be closed through operation of the second valve; the battery coolant line may be connected to the coolant line by the operation of the first valve; the coolant which is cooled in the radiator and stored in the reservoir tank may be supplied to the battery module, while circulating through the battery coolant line by operations of the first valve and the second water pump; the coolant circulating through the battery cooling apparatus may be supplied to the electrical component while circulating through the coolant line by the operation of the first water pump; and a part of the coolant stored in the reservoir tank may be circulated along the coolant line through the opened supply line.

When using the waste heat of the electrical component in the heating mode of the vehicle, in the cooling apparatus, the coolant line connected to the radiator and the coolant line connecting the radiator and the reservoir tank may be closed, and the supply line may be opened; the battery coolant line except for a portion of the battery coolant line connected to the chiller may be closed through operation of the first valve; the chiller connection line may be opened through operation of the second valve; in the heating apparatus, the heating line may be connected to the coolant line through operation of the second valve; the coolant having a temperature that has risen while passing through the electrical component by the operation of the first water pump may be supplied into the heating line connected to the opened coolant line without passing through the radiator; the coolant flowed into the heating line may be supplied to the heater through operation of the third water pump; the coolant discharged from the heater may pass through the chiller along the opened chiller connection line, and then may be again introduced into the electrical component; and a part of the coolant stored in the reservoir tank may be circulated along the coolant line through the opened supply line.

The second valve may open the coolant line connected to the radiator to allow some of the coolant circulating through the heating apparatus to flow into the chiller connection line and the remaining coolant to flow into the radiator when the electrical component is overheated.

The first valve may be a four-way valve, and the second valve may be a five-way valve configured for distributing a flow.

The electrical component may include an electric power control unit (EPCU), or a motor, or an inverter, or an autonomous driving controller, or an on board charger (OBC).

The supply line may be connected to the coolant line when the coolant is circulated to the coolant line by the operation of the first water pump.

A described above, according to the heat pump system for the vehicle according to various exemplary embodiments of the present invention, the temperature of the battery module may be adjusted depending on the mode of the vehicle by use of one chiller for performing heat exchange between the coolant and the refrigerant, and the interior of the vehicle may be heated by use of the coolant, simplifying the entire system.

According to various exemplary embodiments of the present invention, it is also possible to improve the heating efficiency by recovering waste heat from the electrical component and waste heat from the condenser and using it for internal heating.

Furthermore, according to various exemplary embodiments of the present invention, it is possible to optimize the performance of the battery module by efficiently controlling the temperature of the battery module, and increase an overall travel distance of the vehicle through efficient management of the battery module.

Furthermore, according to various exemplary embodiments of the present invention, manufacturing cost may be reduced and a weight may be reduced through simplification of an entire system, and spatial utilization may be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
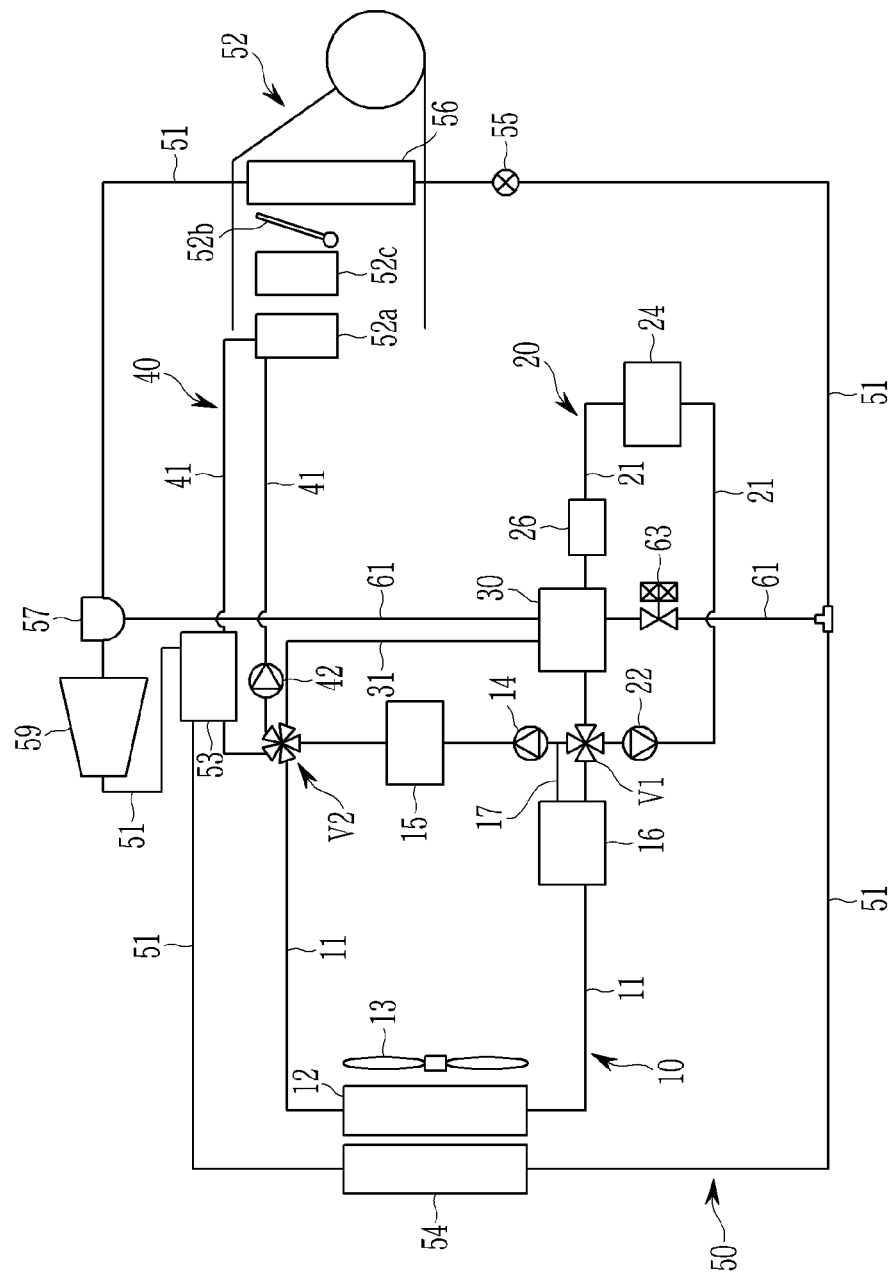
FIG. 1 illustrates a block diagram of a heat pump system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Exemplary embodiments described in the exemplary embodiment and configurations shown in the drawings are just the most preferable exemplary embodiments of the present invention, but do not limit the spirit and scope of the present invention. Therefore, it should be understood that there may be various equivalents and modifications capable of replacing them at the time of filing of the present application.

To clarify the present invention, parts that are not connected to the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Furthermore, the terms, ". . . unit", ". . . mechanism", ". . . portion", ". . . member", etc. used herein mean a unit of inclusive components performing at least one functions or operations.

FIG. 1 is a block diagram of a heat pump system for a vehicle according to various exemplary embodiments of the present invention.

The heat pump system for the vehicle according to various exemplary embodiments of the present invention may adjust a temperature of a battery module 24 by use of one chiller 30 in which a refrigerant and a coolant are heat exchanged, and may recover waste heat generated from an electrical component 15 to use it for internal heating.

Such the heat pump system may be applied to electric vehicles.

Referring to FIG. 1, the heat pump system may include a cooling apparatus 10, a battery cooling apparatus 20, a chiller 30, and a heating apparatus 40.

First, the cooling apparatus 10 includes a radiator 12 connected to a coolant line 11, a first water pump 14, a first valve V1, a second valve V2, and a reservoir tank 16.

The radiator 12 is mounted in the front of the vehicle, and a cooling fan 13 is mounted behind the radiator 12, so that the coolant is cooled through an operation of the cooling fan 13 and heat exchange with the outside air.

Furthermore, the electrical component 15 may include an electric power control unit (EPCU), or a motor, or an inverter, or an autonomous driving controller, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, or the motor, or the inverter, or the autonomous driving controller, or the OBC may be recovered.

Also, the reservoir tank 16 is provided on the coolant line 11 between the radiator 12 and the first water pump 14. The coolant cooled in the radiator 12 may be stored in the reservoir tank 16.

This cooling apparatus 10 may circulate the coolant in the coolant line 11 through operation of the first water pump 14 such that the coolant is supplied to the electrical component 15 provided in the coolant line 11.

Meanwhile, the reservoir tank 16 may be connected to the coolant line 11 connecting the first valve V1 and the first water pump 14 through a supply line 17.

The supply line 17 may be connected to the coolant line 11 when the coolant is circulated to the coolant line 11 by the operation of the first water pump 14.

That is, when the first water pump 14 is operated, the reservoir tank 16 may always flow a portion of the stored coolant into the coolant line 11 through the supply line 17.

Accordingly, when the first water pump 14 is operated, the occurrence of cavitation in the first water pump 14 may be prevented. Furthermore, a damage of the first water pump 14 due to the cavitation may be prevented in advance.

In the exemplary embodiment of the present invention, the battery cooling apparatus 20 includes a battery coolant line 21 connected to the coolant line 11 through the first valve V1 and a second water pump 22 and the battery module 24 connected to the battery coolant line 21.

The battery cooling apparatus 20 may selectively circulate the coolant in the battery module 24 through an operation of the second water pump 22.

Meanwhile, the battery cooling apparatus 20 may further include a coolant heater 26 provided in the battery coolant line 21 between the battery module 24 and the first valve V1.

When it is required to increase the temperature of the battery module 24, the coolant heater 26 is turned on to heat the coolant circulated in the battery coolant line 21 such that the coolant of which temperature is increased may be supplied to the battery module 24.

The coolant heater 26 may be an electric heater that operates according to supply of electric power.

That is, the coolant heater 26 is operated when the temperature of the coolant supplied to the battery module 24 is lower than the target temperature, so that the coolant circulating in the battery coolant line 21 may be heated.

Accordingly, the coolant having an increased temperature while passing through the coolant heater 26 may be supplied to the battery module 24, to raise the temperature of the battery module 24.

That is, the coolant heater 26 may selectively operate when the temperature of the battery module 24 is raised.

In the exemplary embodiment of the present invention, the chiller 30 is provided in the battery coolant line 21 between the first valve V1 and the battery module 24.

The chiller 30 may be connected to a chiller connection line 31 selectively connectable to the coolant line through the second valve V2.

The chiller 30 is connected to a refrigerant line 51 of an air conditioner 50 through a refrigerant connection line 61. That is, the chiller 30 may be a water-cooled heat exchanger into which a coolant flows.

Accordingly, the chiller 30 may regulate the temperature of the coolant by performing heat exchange between the coolant which is selectively supplied to the battery coolant line 21 and the chiller connection line 31, and the refrigerant which is selectively supplied from the air conditioner 50.

Herein, a first end portion of the chiller connection line 31 is connected to the second valve V2. A second end portion of the chiller connection line 31 may be connected to the chiller 30.

The chiller connection line 31 may connect the chiller 30 to the second valve V1 according to the operation of the second valve V2.

The heating apparatus 40 may include a heating line 41 selectively connectable to the coolant line 11 through a second valve V2 to heat a vehicle interior by use of the coolant and a third water pump 42 and a heater 52a provided on the heating line 41.

When an interior of the vehicle is heated, the heating device 40 may connect the coolant line 11 and the heating line 41 connected to the electrical component 15 by the operation of the second valve V2 such that the high-temperature coolant that has passed through the electrical component 15 is supplied to the heating line 41.

Accordingly, the high-temperature coolant may be supplied to the heater 52a along the heating line 41.

That is, the heating apparatus 40 constructed as described above supplies the high temperature coolant introduced from the cooling apparatus 10 to the heating line 41 in the heating mode of the vehicle or the coolant of which the temperature is increased while circulating through the heating line 41 to the heater 52a through operation of the third water pump 42, heating the vehicle interior.

Herein, the first, second, and third water pumps 14, 22, and 42 may be an electric water pump.

Meanwhile, the heater 52a may be provided inside a heating, ventilation, and air conditioning (HVAC) module 52 included in the air conditioner 50.

The HVAC module 52 may further include an air heater 52c provided between the heater 52a and the evaporator 56 to selectively heat the outside air flowing into the heater 52a.

The air heater 52c may be operated to raise the temperature of the outside air flowing into the heater 52a when the temperature of the coolant supplied to the heater 52a is lower than a target temperature for internal heating.

The air heater 52c may be mounted on the front of the heater 52a toward the interior of the vehicle inside the HVAC module 52 to selectively heat the outside air flowing into the heater 52a.

In the exemplary embodiment of the present invention, the air conditioner 50 includes the HVAC module 52, a condenser 53, sub-condenser 54, a first expansion valve 55, an evaporator 56, accumulator 57, and a compressor 59 which are connected through the refrigerant line 51.

First, the HVAC module 52 includes the evaporator 56 connected therewith through the refrigerant line 51, and an opening and closing door 52b for controlling the outside air passing through the evaporator 56 to be selectively introduced into the heater 52a depending on cooling mode, heating mode, and heating and dehumidification modes of the vehicle therein.

That is, the opening and closing door 52b is opened to allow the outside air passing through the evaporator 56 to be introduced into the heater 52a in the heating mode of the vehicle. In contrast, in the cooling mode of the vehicle, the opening and closing door 52b closes off the heater 52a such that the outside air which is cooled while passing through the evaporator 56 directly flows into the vehicle.

Herein, the HVAC module 52 may further include an air heater 52c provided between the heater 52a and the evaporator 56 to selectively heat the outside air flowing into the heater 52a.

The air heater 52c may be operated to raise the temperature of the outside air flowing into the heater 52a when the temperature of the coolant supplied to the heater 52a is lower than a target temperature for internal heating.

In the exemplary embodiment of the present invention, the condenser 53 is connected to the refrigerant line 51 to allow the refrigerant to pass therethrough. The condenser 53 is provided on the heating line 41 between the second valve V2 and the heater 52a such that the coolant circulating the heating apparatus 40 passes through.

This condenser 53 may condense the refrigerant through heat exchange with the coolant circulating the heating line 41. That is, the condenser 53 may be a water-cooled heat exchanger into which the coolant flows.

In the exemplary embodiment of the present invention, the sub-condenser 54 may be provided in the refrigerant line 51 between the condenser 53 and the evaporator 56.

Herein, the sub-condenser 54 may further condense the refrigerant condensed in the condenser 53 through heat exchange with the outside air. In other words, the sub-condenser 54 is mounted in front of the radiator 12 to mutually heat exchange the coolant that has been inflowed therein with the outside air.

As a result, the sub-condenser 54 may be an air-cooled heat exchanger for condensing the refrigerant by use of outside air.

Accordingly, the sub-condenser 54 may further condense the refrigerant which is condensed in the condenser 53 to increase subcooling of the coolant, improving a coefficient of performance (COP), which is a coefficient of the cooling capacity relative to the power required by the compressor.

The first expansion valve 55 is provided in the refrigerant line 51 between the sub-condenser 54 and the evaporator 56. The first expansion valve 55 receives the refrigerant passing through the second condenser 54 to expand it.

In the exemplary embodiment of the present invention, a first end portion of the refrigerant connection line 61 is connected to the refrigerant line 51 between the sub-condenser 54 and the first expansion valve 55. A second end portion of the refrigerant connection line 61 may be connected to the accumulator 57 between the evaporator 56 and the compressor 59.

Herein, a second expansion valve 63 is provided in the refrigerant connection line 61. The second expansion valve 63 may expand the refrigerant flowing through the refrigerant connection line 61 to introduce it into the chiller 30 when the battery module 24 is cooled by the coolant heat exchanged with the refrigerant.

That is, the second expansion valve 63 is operated to expand the refrigerant, when the battery module 24 is cooled by use of the coolant heat exchanged with the refrigerant.

This second expansion valve 63 may introduce the refrigerant exhausted from the sub-condenser 54 into the chiller 30 in a state where the temperature of the refrigerant is reduced by expanding the refrigerant, to further reduce the temperature of the coolant passing through the interior of the chiller 30.

As a result, the coolant having the temperature which is reduced while passing through the chiller 30 is introduced into the battery module 24, being more efficiently cooled.

The compressor 59 is connected thereto between the evaporator 56 and the condenser 53 through the refrigerant line 51. This compressor 59 may compress the gaseous refrigerant and supply the compressed refrigerant to the condenser 53.

The accumulator 57 is provided in the refrigerant line 51 between the evaporator 56 and the compressor 59.

Such the accumulator 57 improves the efficiency and durability of the compressor 59 by supplying only the gaseous refrigerant to the compressor 59.

Herein, the first and second expansion valves 55 and 63 may be electronic expansion valves that selectively expand the coolant while controlling a flow of the refrigerant through the coolant line 51 or the refrigerant connection line 61.

Furthermore, the first valve V1 may be a four-way valve, and the second valve V2 may be a five-way valve configured for distributing the flow.

Hereinafter, an operation and function of the heat pump system for the vehicle according to various exemplary embodiments of the present invention configured as described above will be described in detail with reference to FIG. 2 to FIG. 8.

First, an operation of a case of cooling the electrical component 15 and the battery module 24 using the radiator 12 in the heat pump system for the vehicle according to the exemplary embodiment of the present invention will be described with reference to FIG. 2.

Figure 2:
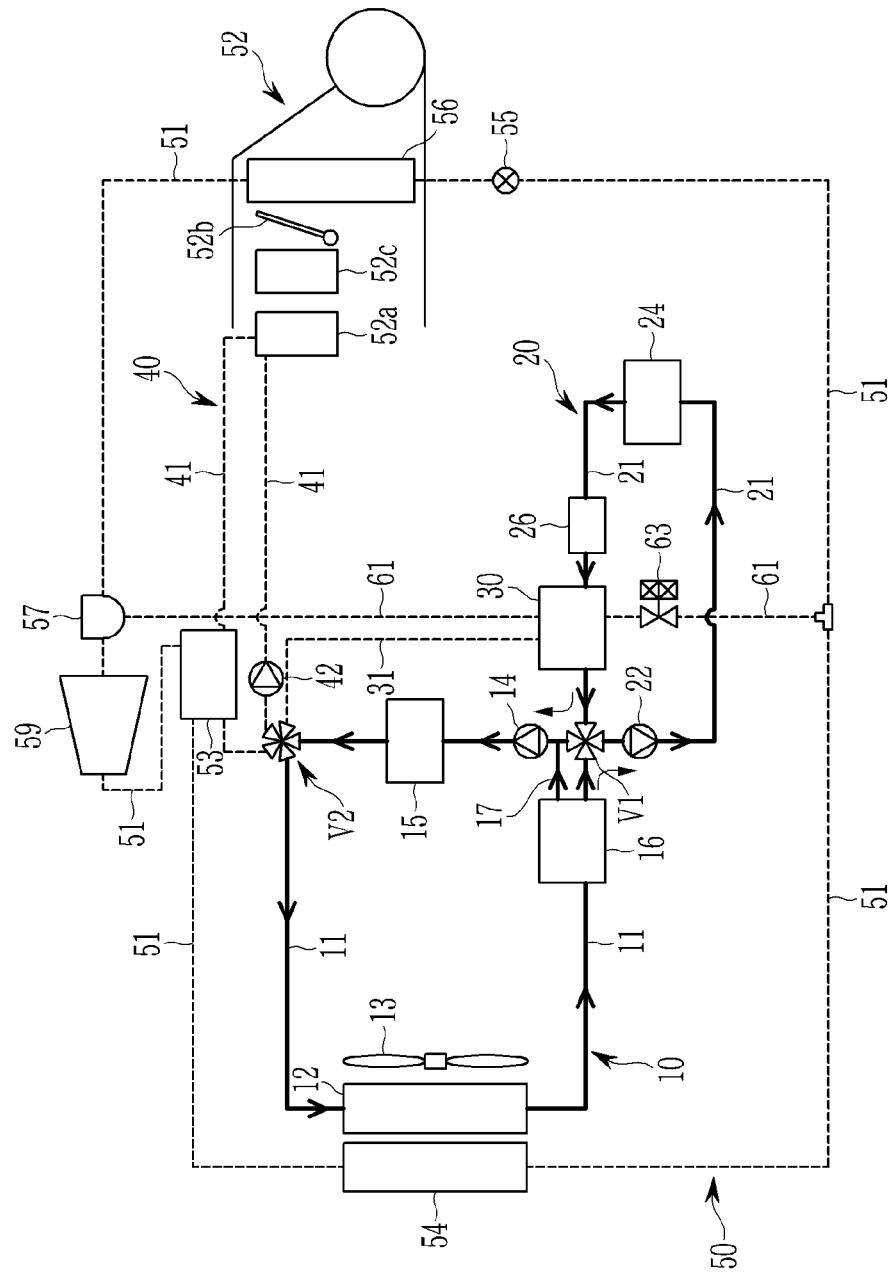
FIG. 2 illustrates an operational state diagram for cooling electrical components and a battery module by use of a radiator in the heat pump system for a vehicle according to various exemplary embodiments of the present invention.

FIG. 2 illustrates an operational state diagram for cooling electrical components and a battery module by use of a radiator in the heat pump system for a vehicle according to various exemplary embodiments of the present invention.

Referring to FIG. 2, the chiller connection line 31 is closed through operation of the third valve V3.

Furthermore, the battery coolant line 21 is connected to the coolant line 11 by the operation of the first valve V1.

In the present state, in the cooling apparatus 10, the first water pump 14 is operated to cool the electrical component 15.

In the battery cooling apparatus 20, the second water pump 22 is operated to cool the battery module 24.

Accordingly, the coolant which is cooled in the radiator 12 and stored in the reservoir tank 16 is supplied to the battery module 24, while circulating through the battery coolant line 21 by operations of the first valve V1 and the second water pump 22.

The coolant circulating through the battery cooling apparatus 20 may be supplied to the electrical component 15 while circulating through the coolant line 11 by the operation of the first water pump 14.

Herein, a part of the coolant stored in the reservoir tank 16 may be circulated along the coolant line 11 through the opened supply line 17.

That is, the coolant cooled in the radiator 12 and stored in the reservoir tank 16 circulates through the coolant line 11 and the battery coolant line 21 by the operations of the first and second water pumps 14 and 22, respectively, to efficiently cool the electrical component 15 and the battery module 24.

The air conditioner 50 is not operated because the cooling mode of the vehicle is not activated.

On the other hand, although it has been described in the exemplary embodiment of the present invention that both of the electrical component 15 and the battery module 24 are cooled, the present invention is not limited thereto, and when one of the electrical component 15 and the battery module 24 is separately cooled, the first and second water pumps 14 and 22 may be selectively operated.

An operation of the case of cooling the battery module 24 by use of the refrigerant will be described with respect to FIG. 3.

Figure 3:
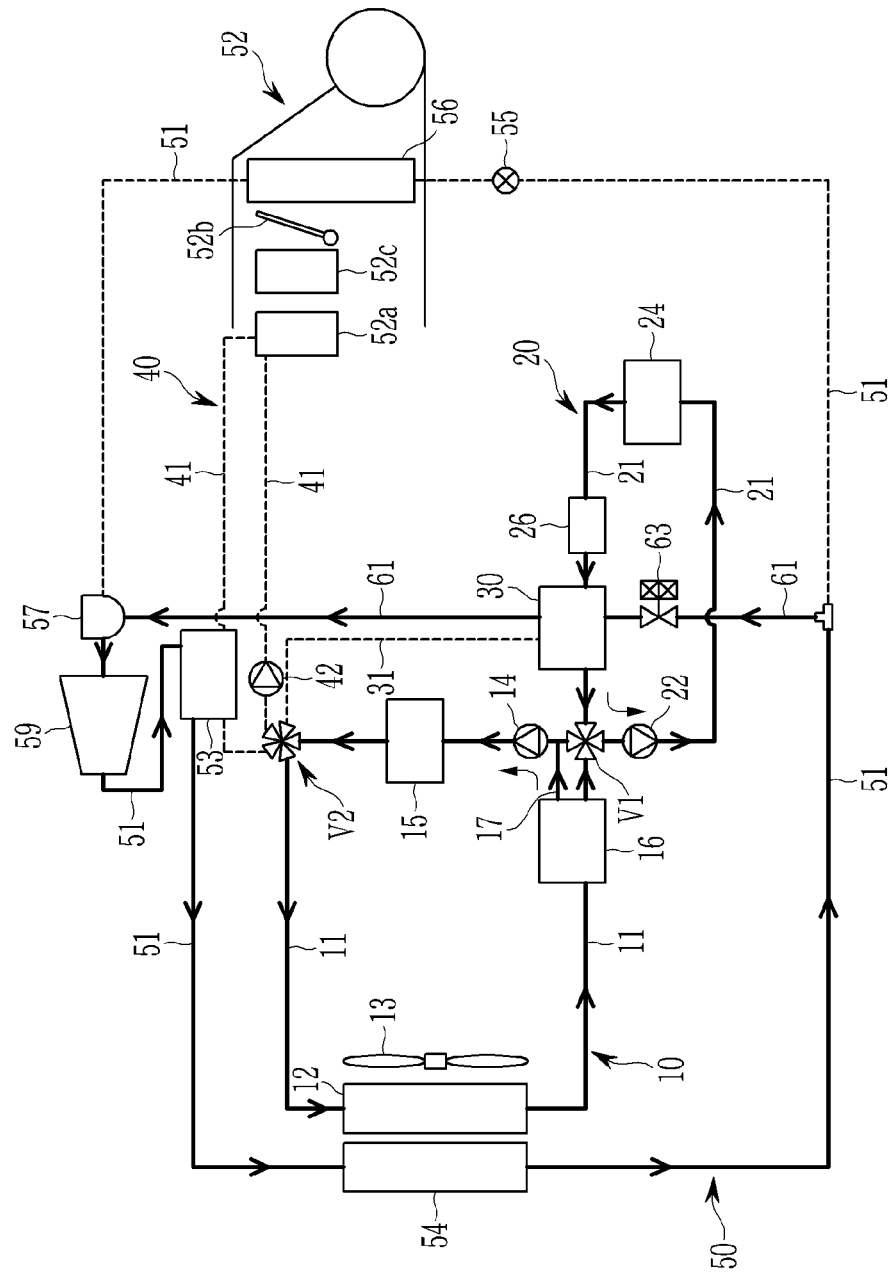
FIG. 3 illustrates an operational state diagram for cooling a battery module by use of a refrigerant in the heat pump system for a vehicle according to various exemplary embodiments of the present invention.

FIG. 3 illustrates an operational state diagram for cooling a battery module by use of a refrigerant in the heat pump system for a vehicle according to various exemplary embodiments of the present invention.

Referring to FIG. 3, the chiller connection line 31 is closed through operation of the third valve V3.

In the present state, in the cooling apparatus 10, the first water pump 14 is operated to cool the electrical component 15.

Accordingly, in the cooling apparatus 10, the coolant is circulated in the coolant line 11 by the operation of the first water pump 14. At the same time, the supply line 17 is opened.

In the battery cooling apparatus 20, the second water pump 22 is operated to cool the battery module 24.

Accordingly, in the battery cooling apparatus 20, the coolant may be circulated in the battery coolant line 21 by the operation of the second water pump 22.

Herein, the cooling apparatus 10 and the battery cooling apparatus 20 may form an independent closed circuit through which each coolant is separately circulated by the operation of the first valve V1.

That is, the battery cooling apparatus 20 is not connected to the coolant line 11 by the operation of the first valve V1. In the instant state, the battery cooling apparatus 20 may form a closed circuit through which the coolant is independently circulated in the battery coolant line 21 by operation of the second water pump 22.

Meanwhile, the heating apparatus 40 is deactivated.

In the air conditioner 50, each constituent element except the evaporator 56 operates so that the refrigerant is supplied to the chiller 30.

That is, in the air conditioner 50, the refrigerant line 51 connected to the evaporator 56 is closed by the operation of the first expansion valve 55. In the instant state, the refrigerant connection line 61 is opened through operation of the second expansion valve 63.

Accordingly, the refrigerant having passed through the sub-condenser 54 may be circulated along the refrigerant line 51 and the refrigerant connection line 61.

Herein, the second expansion valve 63 may expand the refrigerant supplied to the refrigerant connection line 61 and supply the expanded refrigerant to the chiller 30.

Accordingly, the coolant passing through the chiller 30 may circulate in the battery coolant line 21 through operation of the second water pump 22 to cool the battery module 24.

The coolant passing through the chiller 30 is cooled through heat exchange with the expanded refrigerant which is supplied to the chiller 30. The coolant cooled in the chiller 30 is supplied to the battery module 24. Accordingly, the battery module 24 is cooled by the cooled coolant.

That is, the second expansion valve 63 expands the refrigerant passing through the sub-condenser 54 and opens the refrigerant connection line 61 such that the expanded refrigerant is supplied to the chiller 30.

Accordingly, the refrigerant discharged from the sub-condenser 54 is expanded to enter a low-temperature and low-pressure state through operation of the second expansion valve 63, and flows into the chiller 30 connected to the refrigerant connection line 61.

Thereafter, the refrigerant flowing into the chiller 30 is performed heat exchange with the coolant, and then is introduced into the compressor 59 after passing through the accumulator 57 through the refrigerant connection line 61.

The compressor 59 compresses the refrigerant and supplies it to the condenser 53.

The sub-condenser 54 may condense the refrigerant introduced from the condenser 53 through heat exchange with the outside air.

In other words, the coolant with the increased temperature from cooling the battery module 24 is cooled through heat exchange inside the chiller 30 with the low temperature low pressure refrigerant. The cooled coolant is again supplied to the battery module 24 through the battery coolant line 21.

As a result, the coolant may efficiently cool the battery module 24 while repeating the above operation.

On the other hand, in the state of cooling the battery module 24 using a refrigerant, if the cooling of the interior of the vehicle is required, the refrigerant line 51 connecting the sub-condenser 54 and the evaporator 56 may be opened by the operation of the first expansion valve 55.

That is, the first expansion valve 55 may selectively open or close the refrigerant line 51 connecting the sub-condenser 54 and the evaporator 56 according to whether or not the cooling of the interior of the vehicle is required.

In the exemplary embodiment of the present invention, the operation of the cooling mode of the vehicle will be described with reference to FIG. 4.

Figure 4:
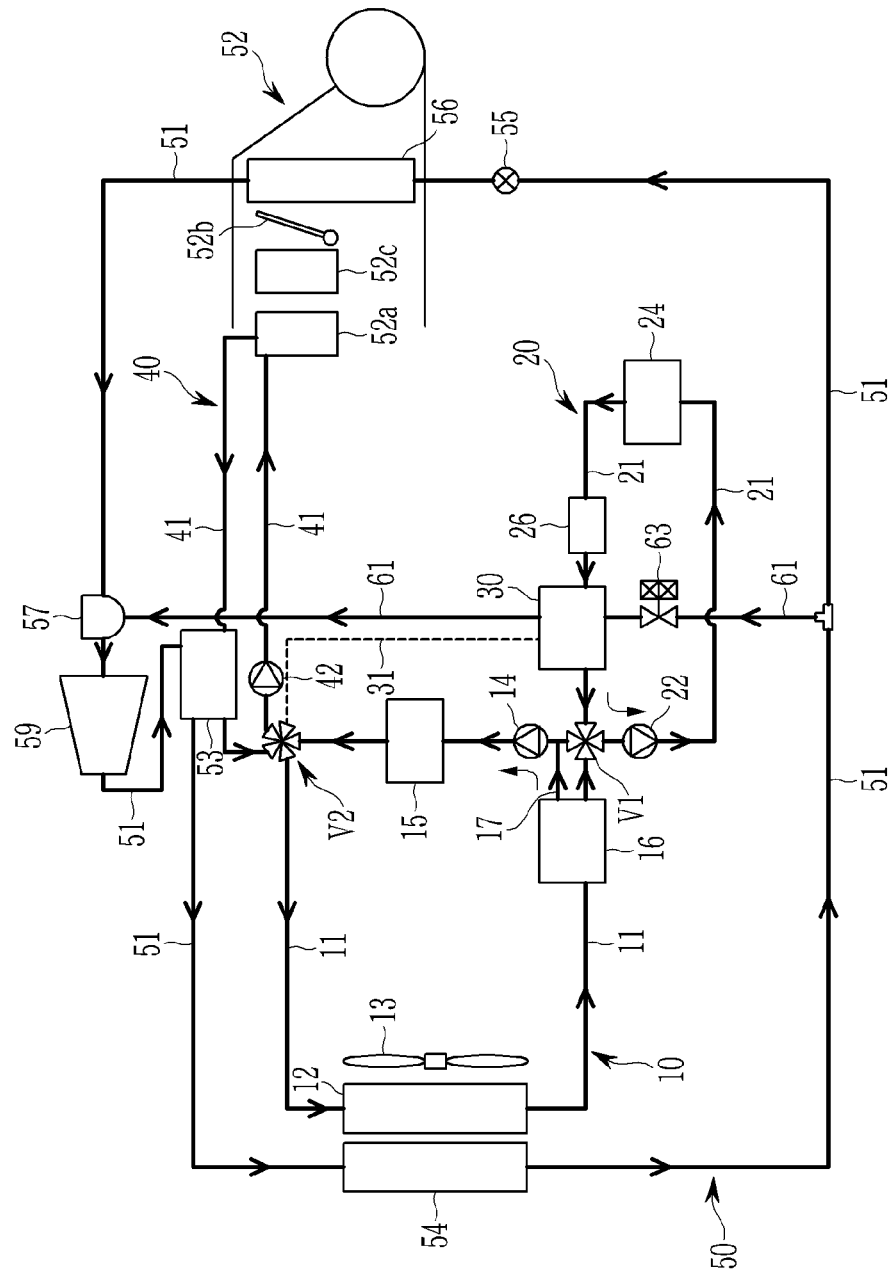
FIG. 4 illustrates an operational state diagram in a cooling mode of a vehicle in the heat pump system for a vehicle according to various exemplary embodiments of the present invention.

FIG. 4 illustrates an operational state diagram in a cooling mode of a vehicle in the heat pump system for a vehicle according to various exemplary embodiments of the present invention.

Referring to FIG. 4, in the cooling apparatus 10, the coolant is circulated in the coolant line 11 through operation of the first water pump. At the same time, the supply line 17 is opened.

Herein, the chiller connection line 31 is closed through operation of the second valve V2.

In the heating apparatus 40, the heating line 41 and the coolant line 11 are connected through operation of the second valve V2.

In the present state, the coolant supplied from the cooling apparatus 10 is circulated in the heating line 41 through operation of the third water pump 42.

Thus, the coolant cooled by the radiator 12 may be supplied to the condenser 53 through operation of the first and third water pumps 14 and 42 after passing through the electrical component 15.

Meanwhile, in the battery cooling apparatus 20, the second water pump 22 is operated to cool the battery module 24.

Accordingly, in the battery cooling apparatus 20, the coolant may be circulated in the battery coolant line 21 by the operation of the second water pump 22.

Herein, the cooling apparatus 10 and the battery cooling apparatus 20 may form an independent closed circuit through which each coolant is separately circulated by the operation of the first valve V1.

That is, the battery cooling apparatus 20 is not connected to the coolant line 11 by the operation of the first valve V1.

In the present state, the battery cooling apparatus 20 may form a closed circuit through which the coolant is independently circulated in the battery coolant line 21 by operation of the second water pump 22.

That is, the coolant line 11 and the battery coolant line 21 form independent closed circuits through operation of the first valve V1, respectively.

Thus, in the battery cooling apparatus 20, the coolant that has passed through the chiller 30 through operation of the second water pump 22 may be supplied to the battery module 24 along the battery coolant line 21.

In the air conditioner 50, each constituent element operates to cool the interior of the vehicle. Accordingly, the refrigerant is circulated along the refrigerant line 51.

Herein, the refrigerant line 51 connecting the sub-condenser 54 and the evaporator 56 is opened through operation of the first expansion valve 55. The refrigerant connection line 61 is opened through operation of the second expansion valve 63.

Accordingly, the refrigerant having passed through the sub-condenser 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 30, respectively.

Meanwhile, the heating apparatus 40 supplies the coolant supplied from the cooling apparatus 10 to the condenser 53 through operation of the third water pump 42.

The condenser 53 condenses the refrigerant by use of the coolant flowing along the heating line 41. The sub-condenser 54 may further condense the refrigerant introduced from the condenser 53 through heat exchange with the outside air.

The coolant passing through the chiller 30 is circulated in the battery coolant line 21 to cool the battery module 24 through operation of the second water pump 22.

The coolant passing through the chiller 30 is cooled through heat exchange with the expanded refrigerant which is supplied to the chiller 30. The coolant cooled in the chiller 30 is supplied to the battery module 24. Accordingly, the battery module 24 is cooled by the cooled coolant.

That is, the second expansion valve 63 expands some of the coolant through the sub-condenser 54 to supply the expanded coolant to the chiller 30, and opens the refrigerant connection line 61.

Accordingly, the refrigerant discharged from the sub-condenser 54 is expanded to enter a low-temperature and low-pressure state through operation of the second expansion valve 63, and flows into the chiller 30 connected to the refrigerant connection line 61.

Thereafter, the refrigerant flowing into the chiller 30 is performed heat exchange with the coolant, and then is introduced into the compressor 59 after passing through the accumulator 57 through the refrigerant connection line 61.

In other words, the coolant with the increased temperature from cooling the battery module 24 is cooled through heat exchange inside the chiller 30 with the low temperature low pressure refrigerant. The cooled coolant is again supplied to the battery module 24 through the battery coolant line 21.

As a result, the coolant circulated in the battery cooling apparatus 20 may efficiently cool the battery module 24 while repeating the above operation.

On the other hand, the remaining refrigerant discharged from the sub-condenser 54 flows through the refrigerant line 51 to cool the interior of the vehicle, and sequentially passes through the first expansion valve 55, the evaporator 56, the compressor 59, and the condenser 53.

Herein, the outside air flowing into the HVAC module 52 is cooled while passing through the evaporator 56 by the low-temperature refrigerant flowing into the evaporator 56.

In the instant case, a portion of the heater 52a through which the cooled outside air passes is closed by the opening and closing door 52b such that the outside air does not pass through the heater 52a. Accordingly, the cooled outside air directly flows into the interior of the vehicle, cooling the vehicle interior.

On the other hand, the coolant having an amount of condensation which is increased while sequentially passing through the condenser 53 and the sub-condenser 54 may be expanded and supplied to the evaporator 56, allowing the refrigerant to be evaporated to a lower temperature.

As a result, in the exemplary embodiment of the present invention, the condenser 53 condenses the refrigerant, and the sub-condenser 54 further condenses the refrigerant, which is advantageous in forming the sub-cooling of the refrigerant.

Furthermore, as the sub-cooled refrigerant may be evaporated to a lower temperature in the evaporator 56, the temperature of the outside air passing through the evaporator 56 may be further lowered, improving cooling performance and efficiency.

The refrigerant may cool the interior of the vehicle in the cooling mode of the vehicle while repeating the above-described processes, and at the same time, may cool the coolant through the heat exchange while passing through the chiller 30.

The low-temperature coolant cooled in the chiller 30 is introduced into the battery module 24. Accordingly, the battery module 24 may be efficiently cooled by the low-temperature coolant supplied therefrom.

In the exemplary embodiment of the present invention, an operation of the case of using the waste heat of the electrical component 15 without operating the air conditioner 50 in the heating mode of the vehicle will be described with reference to FIG. 5.

Figure 5:
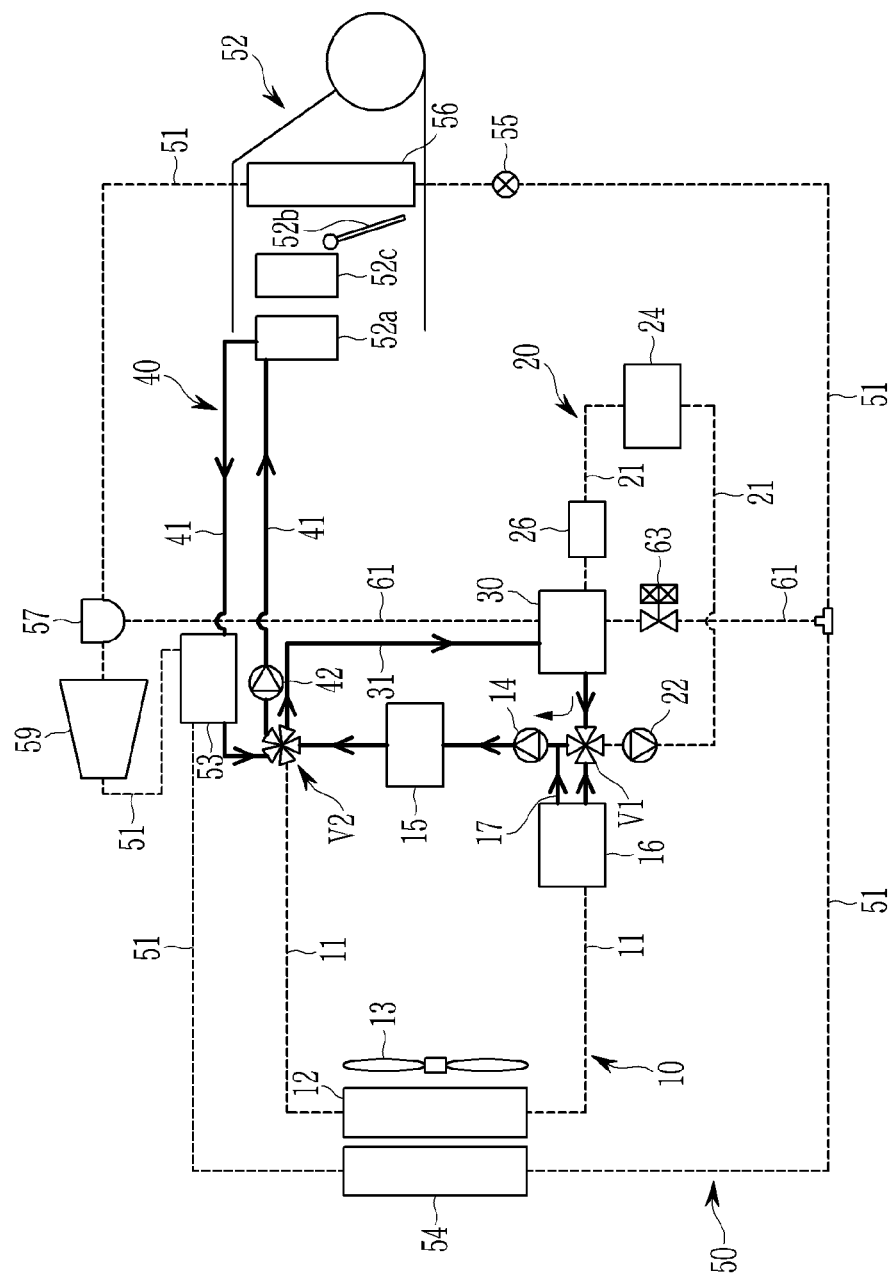
FIG. 5 illustrates an operational state diagram for performing the heating mode using waste heat of an electrical component in a heat pump system for a vehicle according to various exemplary embodiments of the present invention.

FIG. 5 illustrates an operational state diagram for performing the heating mode using waste heat of an electrical component in a heat pump system for a vehicle according to various exemplary embodiments of the present invention.

Referring to FIG. 5, the heat pump system may perform heating the interior of the vehicle by use of waste heat from the electrical component 15.

First, in the cooling apparatus 10, the first water pump 14 is operated for circulation of the coolant. In the instant case, the air conditioner 50 is stopped.

Herein, a portion of the coolant line 11 connected to the radiator 12 and a portion of the coolant line 11 connecting the radiator 12 and the reservoir tank 16 are closed through operation of the third valve V3. The supply line 17 is opened.

Thus, a part of the coolant stored in the reservoir tank 16 may be circulated along the coolant line 11 through the opened supply line 17.

Herein, the battery coolant line 21 except for the battery coolant line 21 connected to the chiller 30 is closed through operation of the first valve V1.

That is, the battery coolant line 21 connecting the second water pump 22 and the battery module 24 is closed, and the operation of the battery cooling apparatus 20 is deactivated.

Furthermore, in the heating apparatus 40, the coolant line 11 and the heating line 41 are connected through operation of the second valve V2.

Herein, the chiller connection line 31 is opened through operation of the third valve V3.

In the present state, the coolant having a temperature that has risen while passing through the electrical component 15 by the operation of the first water pump 14 is supplied into the heating line 41 connected to the opened coolant line 11 without passing through the radiator 12.

The coolant flowed into the heating line 41 may be supplied to the heater 52a through operation of the third water pump 42.

The coolant discharged from the heater 52a is again introduced into the electrical component 15 along the opened coolant line 11, after passing through the chiller 30 along the opened chiller connection line 31.

That is, the coolant that has passed through the electrical component 15 continues to circulate along the opened coolant line 11 without passing through the radiator 12, and absorbs the waste heat from the electric component 15 such that the temperature thereof increases.

The coolant having the temperature that has been raised is supplied to the heater 52a through the heating line 41 connected to the coolant line 11 without passing through the radiator 12.

Herein, the coolant introduced into the heating line 41 passes through the heater 52a by the operation of the third water pump 42. At the instant time, the air heater 52c may be selectively operated depending on the temperature of the outside air passing through the heater 52a.

The air heater 52c may be operated when the temperature of the outside air passing through the heater 52a is lower than a target temperature, heating the outside air flowing into the vehicle interior.

That is, the air heater 52c may be operated when the temperature of the outside air passing through the heater 52a is lower than a target temperature, heating the outside air flowing into the vehicle interior.

The air heater 52c is operated when the temperature of the outside air that has completed heat exchange with the high-temperature coolant while passing through the heater 52a is lower than a predetermined temperature or a target heating temperature.

As a result, when the air heater 52c is operated, the outside air may be heated while passing through the air heater 52c, to be introduced into the vehicle interior in a state where the temperature is raised.

Meanwhile, the high-temperature coolant supplied to the heater 52a performs heat exchange with the outside air, and then is introduced into the coolant line 11 via chiller 30 and the portion of the battery coolant line 21, without passing through the radiator 12 along the heating line 41 and the chiller connection line 31 connected through the second valve V2.

Herein, the opening and closing door 52b is opened such that the outside air flowing into the HVAC module 52 passes through the heater 52a.

Accordingly, the outside air introduced from the outside thereof flows into a room temperature state in which it is not cooled when passing through the evaporator 56 to which no refrigerant is supplied. The introduced outside air may be converted into a high temperature state while passing through the heater 52a, and flows into the vehicle, heating the interior of the vehicle.

In other words, according to various exemplary embodiments of the present invention, it is possible to recover the waste heat generated in the electrical component 15 while repeating the above-described process, and use the waste heat for internal heating, reducing power consumption and improving overall heating efficiency.

On the other hand, in a process of heating the interior of the vehicle by recovering the waste heat of the electrical component 15 using the coolant, when the electrical component 15 is overheated, a portion of the coolant line 11 connected to the radiator 12, and a portion of the coolant line 11 connecting the radiator 12 and the reservoir tank 16 are opened through operation of the second valve V2.

Accordingly, the remaining coolant which is not introduced into the heater 52a is cooled while passing through the radiator 12.

The coolant that has been completely cooled may recover waste heat while passing through the electrical component 15, and at the same time, may efficiently cool the electrical component 15, together with the coolant passing through the chiller 30 along the heating line 41 and the chiller connection line 31.

When the electrical component 15 is overheated, the second valve V2 may open the coolant line 11 connected to the radiator 12 to allow some of the coolant passing through the electrical component 15 to flow into the heating line 41 and the remaining coolant to flow into the radiator 12.

As a result, some coolant cooled in the radiator 12 may be supplied to the electrical component 15, preventing the electrical component 15 from overheating.

Therefore, according to various exemplary embodiments of the present invention, it is possible to recover the waste heat generated in the electrical component 15, and use the waste heat for internal heating, reducing power consumption and improving overall heating efficiency.

At the same time, according to various exemplary embodiments of the present invention, some coolant may be introduced into the radiator 12 through operation control of the second valve V2 configured for distributing the flow, to be cooled, and then be supplied to the electrical component 15, efficiently cooling the electrical component 15 and ensuring the cooling performance of the electrical component 15.

In the exemplary embodiment of the present invention, an operation of the case of recovering the waste heat of the electrical component 15 and the condenser 53 in the heating mode of the vehicle will be described with reference to FIG. 6.

Figure 6:
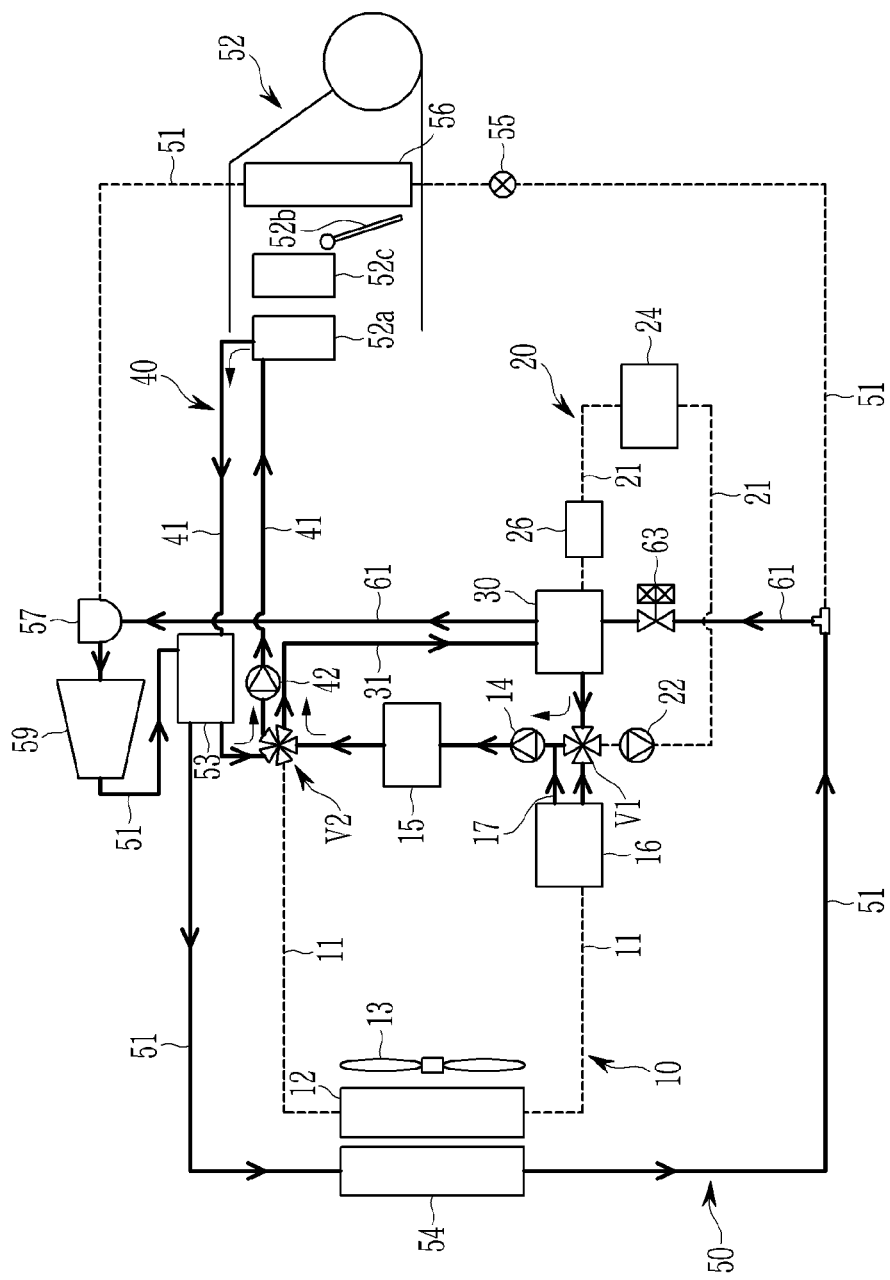
FIG. 6 illustrates an operational state diagram for waste heat recovery of an electrical component and a condenser depending on a heating mode in a heat pump system for a vehicle according to various exemplary embodiments of the present invention.

FIG. 6 illustrates an operational state diagram for waste heat recovery of an electrical component and a condenser depending on a heating mode in a heat pump system for a vehicle according to various exemplary embodiments of the present invention.

Referring to FIG. 6, in the cooling apparatus 10, the first water pump 14 is operated for circulation of the coolant.

Herein, a portion of the coolant line 11 connected to the radiator 12 and a portion of the coolant line 11 connecting the radiator 12 and the reservoir tank 16 are closed. The supply line 17 is opened.

Thus, a part of the coolant stored in the reservoir tank 16 may be circulated along the coolant line 11 through the opened supply line 17.

Furthermore, the battery coolant line 21 except for the battery coolant line 21 connected to the chiller 30 is closed through operation of the first valve V1.

That is, the battery coolant line 21 connecting the second water pump 22 and the battery module 24 is closed, and the operation of the battery cooling apparatus 20 is deactivated.

Meanwhile, the chiller connection line 31 is opened through operation of the second valve V2.

In the present state, the coolant having a temperature that has risen while passing through the electrical component 15 by the operation of the first water pump 14 is supplied into the chiller 30 along the opened coolant line 11 and the opened chiller connection line 31 without passing through the radiator 12.

That is, the coolant that has passed through the electrical component 15 continues to circulate along the opened coolant line 11, the chiller connection line 31, and the opened portion of the battery coolant line 21 without passing through the radiator 12, and absorbs the waste heat from the electric component 15 such that the temperature thereof increases.

The coolant having the temperature that has been raised is supplied to the chiller 30 along the chiller connection line 31.

That is, the coolant, which absorbs the waste heat of the electrical component 15 and is increased in temperature, is recovered by increasing the temperature of the refrigerant supplied to the chiller 30 while passing through the chiller 30 through operation of the first water pump 14.

In the heating apparatus 40, the coolant is circulated along the heating line 41 through operation of the third water pump 42.

As a result, the coolant circulated in the heating line 41 may be supplied to the heater 52a after passing through the condenser 53 through operation of the third water pump 42.

That is, the cooling apparatus 10 and the heating apparatus 40 may form an independent closed circuit through which each coolant is separately circulated by the operation of the second valve V2.

Accordingly, the coolant circulating through the heating line 41 may be supplied to the condenser 53 after passing through the heater 52a through operation of the third water pump 42.

Meanwhile, in the air conditioner 50, each constituent element except the evaporator 56 operates so that the refrigerant is supplied to the chiller 30.

Herein, the refrigerant 51 connected to the evaporator 56 is closed by the operation of the first expansion valve 55. In the instant state, the refrigerant connection line 61 is opened through operation of the second expansion valve 63.

The refrigerant passing through sub-condenser 54 may be circulated along the refrigerant line 51 and the refrigerant connection line 61.

Herein, the second expansion valve 63 may expand the refrigerant supplied from the refrigerant connection line 61 to be supplied to the chiller 30.

The coolant, which absorbs the waste heat of the electrical component 15 is increased in temperature, is recovered by increasing the temperature of the refrigerant supplied to the chiller 30 while passing through the chiller 30 through operation of the first water pump 14.

That is, the chiller 30 receives the refrigerant supplied from the sub-condenser 54 and expanded through operation of the second expansion valve 63 through the refrigerant connection line 61.

And accordingly, the chiller 30 evaporates the supplied refrigerant through heat exchange with the coolant of which the temperature is increased while passing through the electrical component 15, recovering the waste heat of the electrical component 15.

Thereafter, the refrigerant passing through the chiller 30 is supplied to the accumulator 57 along the refrigerant connection line 61.

The refrigerant supplied to the accumulator 57 is separated into gas and liquid. of the refrigerant separated by gas and liquid, the gaseous refrigerant is supplied to the compressor 59.

The refrigerant compressed with the high temperature high pressure from the compressor 59 inflows to the condenser 53.

Herein, the refrigerant supplied to the condenser 53 may increase the temperature of the coolant by exchanging heat with the coolant circulating through the heating line 41. The coolant with raised temperature is supplied to the heater 52a.

That is, the heating apparatus 40 supplies the coolant circulating through the heating line 41 to the condenser 53 through operation of the third water pump 42.

Accordingly, the condenser 53 condenses the refrigerant supplied from the compressor 59 using the coolant circulating along the heating line 41.

At the present time, the temperature of the coolant circulating in the heating line 41 is increased by heat exchange with the refrigerant while passing through the condenser 53. The coolant with the increased temperature may be supplied to the heater 52a along the heating line 41.

Herein, the air heater 52c may be selectively operated depending on the temperature of the outside air passing through the heater 52a.

The air heater 52c may be operated when the temperature of the outside air passing through the heater 52a is lower than a target temperature, heating the outside air flowing into the vehicle interior.

That is, the air heater 52c may be operated when the temperature of the outside air passing through the heater 52a is lower than a target temperature, heating the outside air flowing into the vehicle interior.

The air heater 52c is operated when the temperature of the outside air that has completed heat exchange with the high-temperature coolant while passing through the heater 52a is lower than a predetermined temperature or a target heating temperature.

As a result, when the air heater 52c is operated, the outside air may be heated while passing through the air heater 52c, to be introduced into the vehicle interior in a state where the temperature is raised.

Herein, the opening and closing door 52b is opened such that the outside air flowing into the HVAC module 52 and passing through the evaporator 56 passes through the heater 52a.

Accordingly, the outside air introduced from the outside thereof flows into a room temperature state in which it is not cooled when passing through the evaporator 56 to which no refrigerant is supplied. The introduced outside air may be converted into a high temperature state while passing through the heater 52a, and flows into the vehicle, heating the interior of the vehicle.

That is, the heat pump system according to the exemplary embodiment of the present invention is used to increase the temperature of the refrigerant by use of the waste heat of the electrical component 15 and the condenser 53, reducing the power consumption of the compressor 59 and improving the cooling efficiency.

In the exemplary embodiment of the present invention, the operation of the heating and dehumidification mode of the vehicle will be described with reference to FIG. 7.

Figure 7:
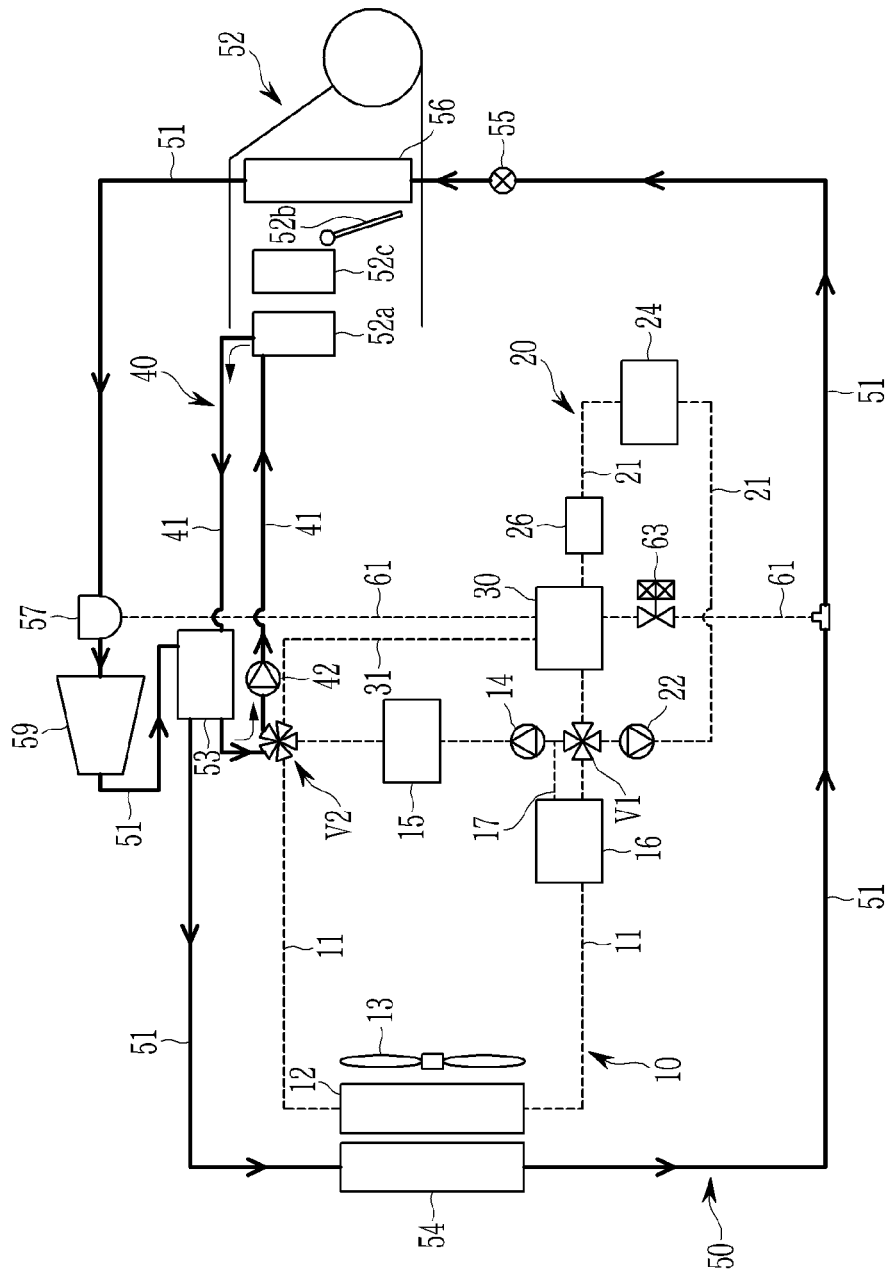
FIG. 7 illustrates an operational state diagram for a heating and dehumidification mode in a heat pump system for a vehicle according to various exemplary embodiments of the present invention.

FIG. 7 illustrates an operational state diagram for a heating and dehumidification mode in a heat pump system for a vehicle according to various exemplary embodiments of the present invention.

Referring to FIG. 7, the cooling apparatus 10 and the battery cooling apparatus 20 are deactivated.

Herein, the coolant line 11 and the chiller connection line 31 are closed through operation of the second valve V2.

In the heating apparatus 40, the coolant is circulated along the heating line 41 through operation of the third water pump 42.

The coolant circulating through the heating line 41 may be supplied to the heater 52a after passing through the condenser 53 through operation of the third water pump 42.

Accordingly, the condenser 53 condenses the refrigerant supplied from the compressor 59 using the coolant circulating along the heating line 41.

At the present time, the temperature of the coolant circulating in the heating line 41 is increased by heat exchange with the refrigerant while passing through the condenser 53. The coolant with the increased temperature may be supplied to the heater 52a along the heating line 41.

Herein, the air heater 52c may be selectively operated depending on the temperature of the outside air passing through the heater 52a.

The air heater 52c may be operated when the temperature of the outside air passing through the heater 52a is lower than a target temperature, heating the outside air flowing into the vehicle interior.

That is, the air heater 52c may be operated when the temperature of the outside air passing through the heater 52a is lower than a target temperature, heating the outside air flowing into the vehicle interior.

The air heater 52c is operated when the temperature of the outside air that has completed heat exchange with the high-temperature coolant while passing through the heater 52a is lower than a predetermined temperature or a target heating temperature.

As a result, when the air heater 52c is operated, the outside air may be heated while passing through the air heater 52c, to be introduced into the vehicle interior in a state where the temperature is raised.

Meanwhile, in the air conditioner 50, each constituent element operates for dehumidification the vehicle interior. Accordingly, the refrigerant is circulated along the refrigerant line 51 by the operation of the compressor 59.

Herein, the refrigerant line 51 connecting the sub-condenser 54 and the evaporator 56 is opened through operation of the first expansion valve 55. The refrigerant connection line 61 is closed through operation of the second expansion valve 63.

Herein, the refrigerant supplied to the condenser 53 may increase the temperature of the coolant by heat exchanging with the coolant circulating through the heating line 41. The coolant with raised temperature is supplied to the heater 52a.

On the other hand, the expanded refrigerant supplied to the evaporator 56 through operation of the first expansion valve 55 is supplied to the compressor 59 via the accumulator 57 along the refrigerant line 51 after heat exchanging with the outside air passing through the evaporator 56.

That is, the refrigerant passing through the evaporator 56 may pass through the accumulator 57 and be supplied to the compressor 59 passing through.

The refrigerant compressed with the high temperature high pressure from the compressor 59 flows into the condenser 53.

Herein, the opening and closing door 52b is opened such that the outside air flowing into the HVAC module 52 and passing through the evaporator 56 passes through the heater 52a.

That is, the outside air flowed into the HVAC module 52 is dehumidified while passing through the evaporator 56 by the refrigerant of the low temperature state flowed into the evaporator 56. Next, the outside air is converted into a high temperature state while passing through the heater 52a and inflowing to the vehicle interior, heating and dehumidification the interior of the vehicle.

That is, the heat pump system according to the exemplary embodiment of the present invention selectively absorbs the external heat depending on the internal temperature of the vehicle along with the waste heat generated from the condenser 53 in the heating and dehumidification mode of the vehicle by being used to increase the temperature of the refrigerant, reducing the power consumption of the compressor 59 and improving the heating efficiency.

An operation of the case of heating the battery module 24 will be described with respect to FIG. 8.

Figure 8:
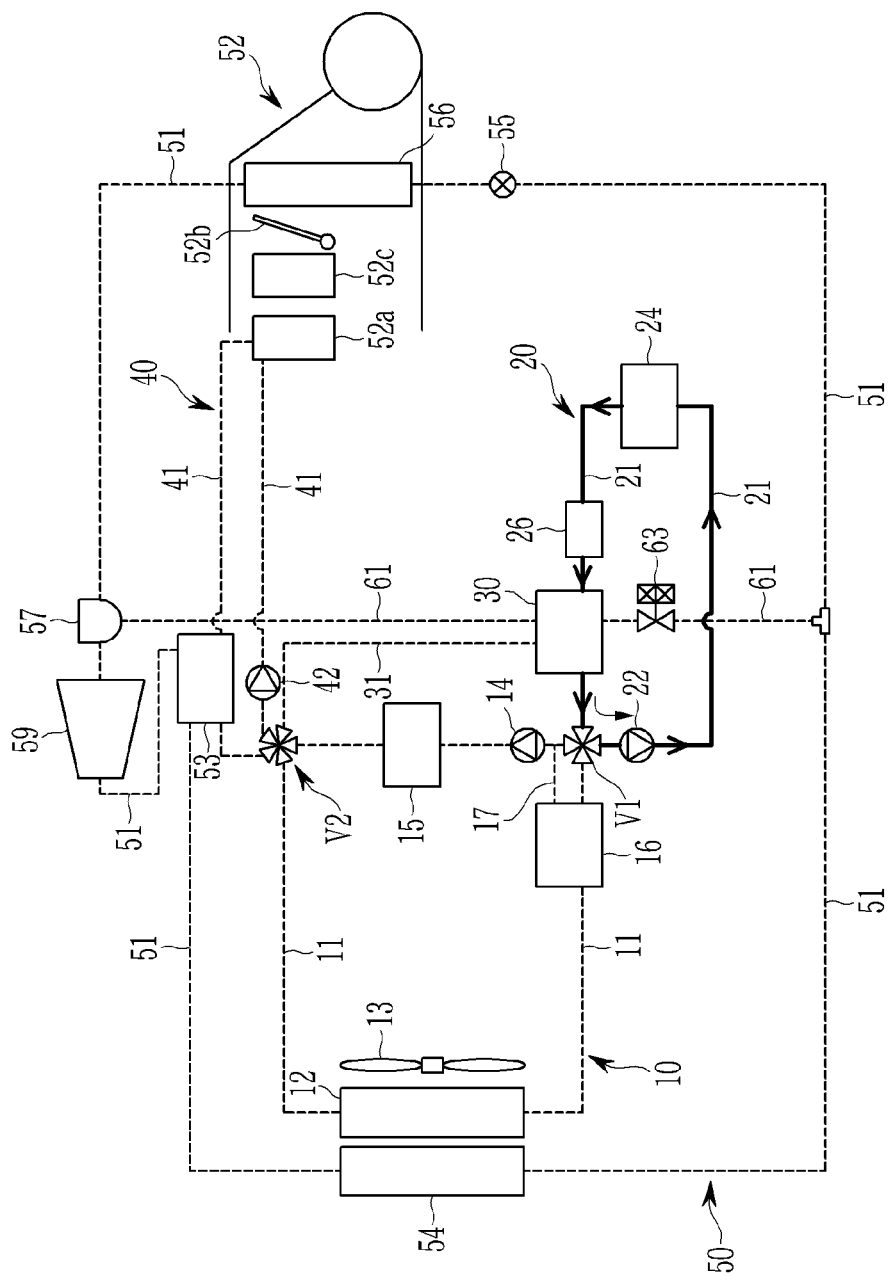
FIG. 8 illustrates an operational state diagram for heating of a battery module in a heat pump system for a vehicle according to various exemplary embodiments of the present invention.

FIG. 8 illustrates an operational state diagram for heating of a battery module in a heat pump system for a vehicle according to various exemplary embodiments of the present invention.

Referring to FIG. 8, the cooling apparatus 10, the heating apparatus 40, and the air conditioner 50 are deactivated.

Herein, the battery coolant line 21 is not connected to the coolant line 11 by the operation of the first valve V1.

That is, in the battery cooling apparatus 20, the battery coolant line 21 connecting the second water pump 22, the battery module 24, and the coolant heater 26 is opened.

In the present state, the coolant is circulated along the battery coolant line 21 by the operation of the second water pump 22.

Herein, the coolant heater 26 is operated to heat the coolant supplied to the battery module 24 along the open battery coolant line 21.

Accordingly, the coolant circulating in the battery coolant line 21 rises in temperature as it passes through the coolant heater 26. Accordingly, the coolant having an increased temperature while passing through the coolant heater 26 may be supplied to the battery module 24, to raise the temperature of the battery module 24.

As a result, according to various exemplary embodiments of the present invention, it is possible to rapidly increase the temperature of the battery module 24 while repeating the above-described process, efficiently managing the temperature of the battery module 24.

Thus, if the heat pump system for the vehicle according to various exemplary embodiments of the present invention as described above is applied, the temperature of the battery module 24 may be adjusted depending on the mode of the vehicle by use of one chiller 30 for performing heat exchange between the coolant and the refrigerant, and the interior of the vehicle may be heated by use of the coolant, simplifying the entire system.

According to various exemplary embodiments of the present invention, it is also possible to improve the heating efficiency by recovering waste heat from the electrical component 15 and using it for internal heating.

Furthermore, according to various exemplary embodiments of the present invention, it is possible to optimize the performance of the battery module 24 by efficiently controlling the temperature of the battery module 24, and increase an overall travel distance of the vehicle through efficient management of the battery module 24.

Furthermore, the entire system may be simplified to reduce manufacturing cost and weight, and to improve space utilization.

In various exemplary embodiments of the present invention, a controller is connected to at least one of the elements of the heat pump system, to control the operations thereof.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the heat pump system comprising:
   a cooling apparatus including a radiator, a first pump, a first valve, a second valve, and a reservoir tank which are connected through a coolant line, to circulate a coolant in the coolant line to cool at least one electrical component provided in the coolant line;
   a battery cooling apparatus including a battery coolant line connected to the coolant line through the first valve, and a second pump and a battery module which are connected through the battery coolant line to circulate the coolant in the battery module;

a heating apparatus including a heating line connected to the coolant line through the second valve to heat a vehicle interior by use of a coolant and a third pump and a heater provided on the heating line;

a chiller provided in the battery coolant line between the first valve and the battery module, connected to a chiller connection line through the second valve connected to the chiller connection line, and connected to a refrigerant line of an air conditioner through a refrigerant connection line, to adjust a temperature of the coolant by performing heat exchange between the coolant which is circulated in the battery coolant line and a refrigerant which is selectively supplied through the refrigerant line from the air conditioner; and wherein the reservoir tank is provided in the coolant line between the radiator and the first valve, and is connected to the coolant line connecting the first valve and the first pump through a supply line bypassing the first valve.

2. The heat pump system of claim 1, wherein the heater is provided inside a heating, ventilation, and air conditioning (HVAC) module of the air conditioner.

3. The heat pump system of claim 1, wherein the battery cooling apparatus further includes a coolant heater provided in the battery coolant line between the battery module and the chiller.

4. The heat pump system of claim 3, wherein
when the battery module is heated,
the battery coolant line is not connected to the coolant line by operation of the first valve;
a coolant is circulated along the battery coolant line by operation of the second pump; and
the coolant heater is operated to heat the coolant supplied to the battery module along the battery coolant line.

5. The heat pump system of claim 1, wherein the air conditioner includes:
an HVAC module including an evaporator which is connected to the refrigerant line and a door configured to control an outside air passing through the evaporator to be selectively introduced into the heater depending on a cooling mode, a heating mode, and a heating and dehumidification mode of the vehicle;
a condenser provided in the heating line between the second valve and the heater to circulate a coolant therein to perform heat exchange between the coolant and a refrigerant supplied through the refrigerant line connected to the condenser;
a compressor connected between the evaporator and the condenser through the refrigerant line;
a first expansion valve provided in the refrigerant line between the condenser and the evaporator; and
a second expansion valve provided in the refrigerant connection line.

6. The heat pump system of claim 5, wherein the air conditioner further includes:
a sub-condenser provided in the refrigerant line between the condenser and the evaporator; and
an accumulator provided in the refrigerant line between the evaporator and the compressor and connected to the refrigerant connection line.

7. The heat pump system of claim 6,
wherein a first end portion of the refrigerant connection line is connected to the refrigerant line between the sub-condenser and the first expansion valve, and
wherein a second end portion of the refrigerant connection line is connected to the accumulator between the evaporator and the compressor.

8. The heat pump system of claim 6, wherein each of the chiller and the condenser is a water-cooled heat exchanger, and the sub-condenser is an air-cooled heat exchanger.

9. The heat pump system of claim 5, wherein the HVAC module further includes an air heater mounted between the heater and the evaporator to selectively heat the outside air passing through the heater.

10. The heat pump system of claim 9, wherein the air heater is operated to raise a temperature of the outside air introduced into the heater when a temperature of a coolant supplied to the heater is lower than a target temperature for internal heating.

11. The heat pump system of claim 5, wherein
when the battery module is cooled by use of the refrigerant,
in the cooling apparatus, the coolant is circulated in the coolant line by the operation of the first pump, and the supply line is opened;
the chiller connection line is closed through operation of the second valve;
the heating apparatus is deactivated;
in the battery cooling apparatus, the coolant is circulated in the battery coolant line by operation of the second pump;
the cooling apparatus and the battery cooling apparatus form an independent closed circuits through which the coolant is separately circulated by operation of the first valve;
in the air conditioner, the refrigerant line connected to the evaporator by operation of the first expansion valve is closed, and the refrigerant connection line is opened through operation of the second expansion valve; and
the second expansion valve expands a refrigerant supplied to the refrigerant connection line and supplies the expanded refrigerant to the chiller.

12. The heat pump system of claim 5, wherein
when the battery module is cooled in the cooling mode of the vehicle,
in the cooling apparatus, the coolant is circulated in the coolant line by operation of the first pump, and the supply line is opened;
the chiller connection line is closed through operation of the second valve;
in the heating apparatus, the coolant is circulated in the heating line through operation of the third pump in a state where the coolant line and the heating line are connected through operation of the second valve;
in the battery cooling apparatus, the coolant is circulated in the battery coolant line by operation of the second pump;
the cooling apparatus and the battery cooling apparatus form an independent closed circuits through which the coolant is separately circulated by operation of the first valve;
in the air conditioner, the refrigerant line connected to the evaporator by operation of the first expansion valve is closed, and the refrigerant connection line is opened through operation of the second expansion valve; and
the second expansion valve expands a refrigerant supplied to the refrigerant connection line and supplies the expanded refrigerant to the chiller.

13. The heat pump system of claim 5, wherein
when performing the heating and dehumidification mode of the vehicle,
the cooling apparatus and the battery cooling apparatus are deactivated;

the coolant line and the chiller connection line are closed through operation of the second valve;

in the heating apparatus, the coolant is circulated in the heating line through operation of the third pump; and in the air conditioner, the refrigerant connection line is closed by operation of the second expansion valve, and the refrigerant is circulated along the refrigerant line by operation of the compressor.

14. The heat pump system of claim 5, wherein
when waste heat of the at least one electrical component and the condenser is recovered in the heating mode of the vehicle, in the cooling apparatus, the coolant line connected to the radiator and the coolant line connecting the radiator and the reservoir tank are closed, and the supply line is opened;

the battery coolant line except for a portion of the battery coolant line connected to the chiller is closed through operation of the first valve;

the chiller connection line is opened through operation of the second valve;

the coolant having a temperature that has risen while passing through the at least one electrical component by operation of the first pump is supplied to the chiller along the opened coolant line and the opened chiller connection line without passing through the radiator;

the coolant is circulated along the heating line through operation of the third pump;

a part of the coolant stored in the reservoir tank is circulated along the opened coolant line through the opened supply line;

the cooling apparatus and the heating apparatus form an independent closed circuit through which the coolant is separately circulated by operation of the second valve;

in the air conditioner, the refrigerant line connected to the evaporator by operation of the first expansion valve is closed, and the refrigerant connection line is opened through operation of the second expansion valve;

the refrigerant is circulated along the refrigerant line by operation of the compressor; and the second expansion valve expands a refrigerant supplied to the refrigerant connection line and supplies the expanded refrigerant to the chiller.

15. The heat pump system of claim 1, wherein
when cooling the at least one electrical component and the battery module by use of the coolant cooled in the radiator, the chiller connection line is closed through operation of the second valve;

the battery coolant line is connected to the coolant line by operation of the first valve;

the coolant which is cooled in the radiator and stored in the reservoir tank is supplied to the battery module, while circulating through the battery coolant line by operations of the first valve and the second pump;

the coolant circulating through the battery cooling apparatus is supplied to the at least one electrical component while circulating through the coolant line by operation of the first pump; and a part of the coolant stored in the reservoir tank is circulated along the coolant line through the opened supply line.

16. The heat pump system of claim 1, wherein
when using a waste heat of the at least one electrical component in a heating mode of the vehicle, in the cooling apparatus, the coolant line connected to the radiator and the coolant line connecting the radiator and the reservoir tank are closed, and the supply line is opened;

the battery coolant line except for a portion of the battery coolant line connected to the chiller is closed through operation of the first valve;

the chiller connection line is opened through operation of the second valve;

in the heating apparatus, the heating line is connected to the coolant line through operation of the second valve;

the coolant having a temperature that has risen while passing through the at least one electrical component by operation of the first pump is supplied into the heating line connected to the opened coolant line without passing through the radiator;

the coolant flowed into the heating line is supplied to the heater through operation of the third pump;

the coolant discharged from the heater passes through the chiller along the opened chiller connection line, and then is again introduced into the electrical component; and a part of the coolant stored in the reservoir tank is circulated along the coolant line through the opened supply line.

17. The heat pump system of claim 16, wherein the second valve opens the coolant line connected to the radiator to allow a part of the coolant passing through the at least one electrical component to flow into the heating line and a remaining coolant to flow into the radiator when the at least one electrical component is overheated.

18. The heat pump system of claim 1, wherein the first valve is a four-way valve, and the second valve is a five-way valve configured for distributing a flow.

19. The heat pump system of claim 1, wherein the at least one electrical component includes a motor, or an electric power control unit (EPCU), or an inverter, or an autonomous driving controller, or an on board charger (OBC).

20. The heat pump system of claim 1, wherein the supply line is connected to the coolant line, when the coolant is circulated to the coolant line by operation of the first pump.

* * * * *